March 11, 1958 D. G. RENNO 2,826,447
COMBINATION VEHICLE BODY HEADER
AND DOOR HEADER STRUCTURE
Filed Feb. 20, 1956

INVENTOR.
DONALD G. RENNO
BY
ATTORNEYS

United States Patent Office 2,826,447
Patented Mar. 11, 1958

2,826,447

COMBINATION VEHICLE BODY HEADER AND DOOR HEADER STRUCTURE

Donald G. Renno, Birmingham, Mich., assignor to Motor Products Corporation, Detroit, Mich., a corporation of New York Application February 20, 1956, Serial No. 566,409

6 Claims. (Cl. 296—28)

This invention relates generally to a combination vehicle body header and door header structure, and refers more particularly to improvements in the construction of the vehicle body and door headers respectively and to improved means for sealing the joint provided between such headers when the door of the vehicle body is in closed position.

One of the essential objects of the invention is to provide a vehicle body and door header structure embodying two rolled metal sections that are stronger in construction and are less expensive to make than conventional stampings.

Another object is to provide rolled sections of the type mentioned that can be easily made to the desired configuration to accommodate various associated parts, including desired weatherstrips.

Another object is to provide a door header wherein one or more flanges heretofore believed necessary have been omitted, and wherein the outer face of the rolled door section is narrower than heretofore.

Another object is to provide a door header wherein the outer side of a downwardly opening channel for receiving the upper edge of a vertically slidable glass panel of the door is shaped to support a trim or molding strip that enhances and improves the exterior appearance of the structure and wherein the inner side of such channel is provided with an inwardly projecting horizontal flange adapted to engage a weatherstrip carried by the vehicle body header to seal the joint between the door header and vehicle body header when the door is in closed position.

Another object is to provide a door header that is provided between the outer and inner sides aforesaid with an upwardly opening channel portion operable as a water drain trough.

Another object is to provide a body header having a tubular rail portion provided at the outer side thereof with an outwardly extending or lateral flange cooperating with the lower edge portion of a roof panel of the vehicle body to provide an outer roof rail or gutter for water draining from said roof panel, and is provided at the inner side thereof with a downwardly opening groove or channel and a downwardly extending flange of substantially L cross section that collectively hold the weatherstrip aforesaid that is engageable by the door header.

Another object is to provide a body header wherein the outwardly extending or lateral flange just mentioned is shaped to be firmly engaged by a trim or molding strip adapted to cooperate with the door header trim or molding strip aforesaid to improve the exterior appearance of the structure.

Another object is to provide a body header wherein the downwardly extending flange aforesaid has a portion to which a head lining, a trim molding, and a retainer strip may be attached, and is provided below said weatherstrip with an upwardly open channel or trough portion for receiving any water draining downwardly from the joint between said weatherstrip and door header.

Another object is to provide a body header wherein the trim molding just mentioned is provided below the lower edge of the head lining with a trough portion that is adapted to receive water overflowing the outer edge of the trough portion of the downwardly extending flange, and that is engageable by the inner side of the door header to form a second seal between the door and body headers when the door is in closed position.

Another object is to provide a body header wherein the fastening means for the head lining, trim molding, and retainer strip have head portions engaged with and concealed by the retainer strip, and have shank portions that effectively hold the weatherstrip aforesaid against accidental displacement from the body header.

Another object is to provide a retainer strip that is assembled in such a manner with the trim molding that it cooperates with the fastening means to hold the trim molding and head lining upon the body header and cooperates with the trim molding to enhance and improve the interior appearance of the structure.

Other objects, advantages and novel details of construction of this invention will be made more apparent as this description proceeds, especially when considered in connection with the accompanying drawing, wherein.

Figure 1:
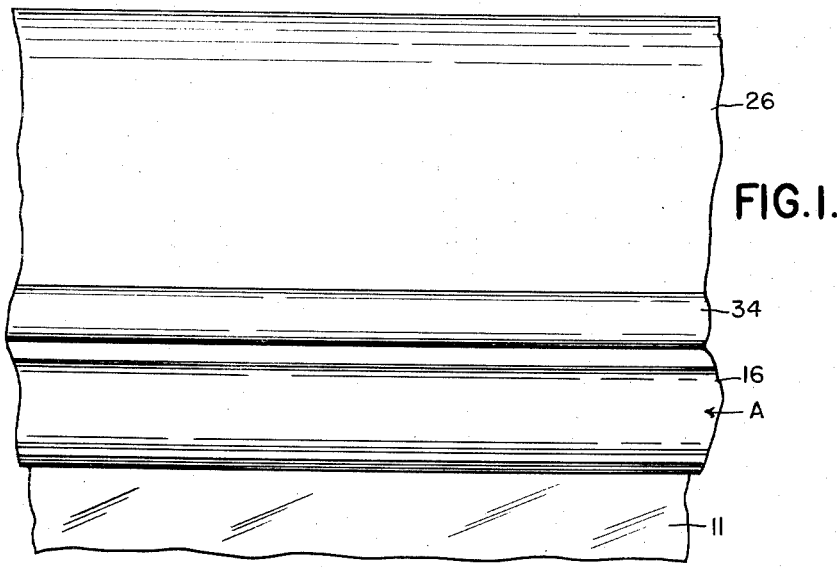
Figure 1 is an elevational view of the structure embodying my invention.
Figure 2:
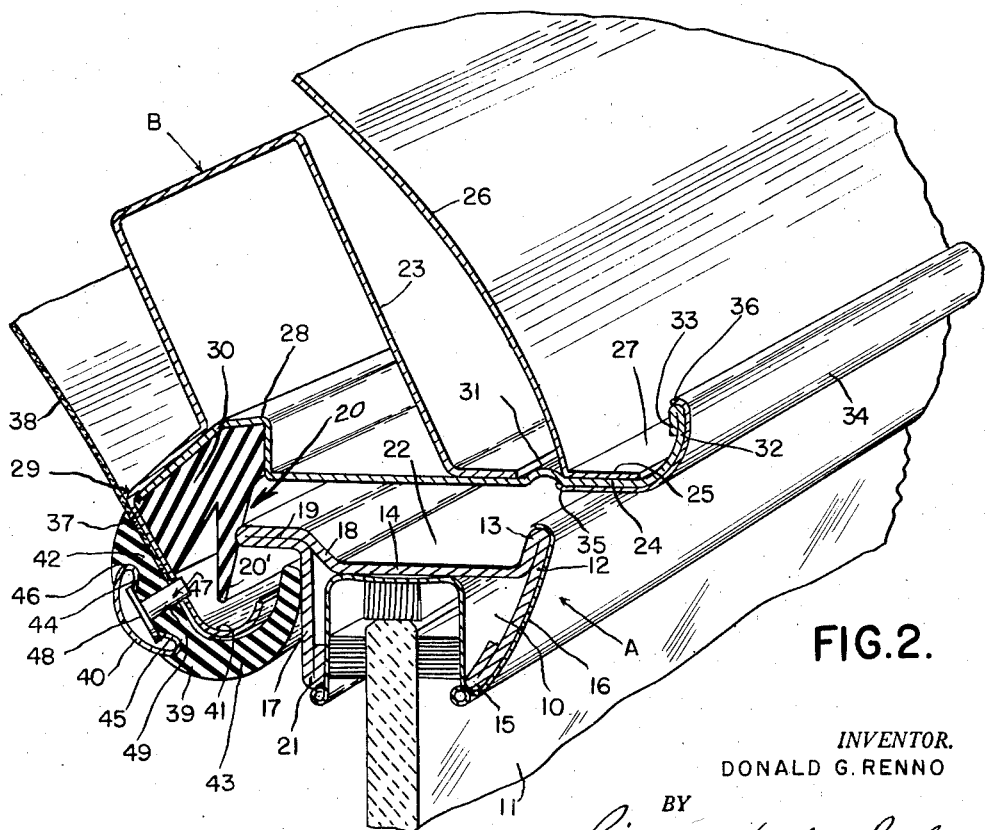
Figure 2 is a sectional perspective view thereof with parts broken away and in section.

Referring now to the drawing, A is the door header, and B is the vehicle body header of an assembly embodying my invention.

As shown, the door header A comprises a rolled steel section having a downwardly opening channel 10 for receiving the upper edge of a vertically slidable glass panel 11 of a suitable door.

The outer side 12 of the channel has a closely return-bent portion 13 projecting upwardly above the base 14 of the channel, and has a closely return-bent portion 15 at its lower edge, whereby a trim or molding strip 16 may be snapped over said return-bent portions 13 and 15 to embrace said side 12 to enhance and improve the exterior appearance of the structure. Thus the outer side 12 of the door header is narrower than heretofore, and one or more flanges heretofore believed necessary have been omitted.

The inner side 17 of the channel 10 has a closely return-bent portion 18 projecting upwardly above the base 14 of the channel and thence laterally inward to provide a flange 19 adapted to engage a sealing flap portion 20' of a weatherstrip 20 of resilient material such as rubber or rubber composition carried by the vehicle body header B to seal the joint between the door header and vehicle body header when the door is in closed position, and is provided at its lower edge with a closely return-bent portion 21.

The upwardly projecting portions 13 and 18 respectively of the sides 12 and 17 of the channel 10 cooperate with the base 14 of the channel to provide an upwardly opening channel portion 22 operable as a water drain trough.

The vehicle body header B comprises a rolled steel section having a tubular rail portion 23 provided at the outer lower side thereof with an outwardly extending or lateral flange 24 of inverted substantially L cross section cooperating with the lower flat edge portion 25 of a roof panel 26 of the vehicle body to provide an outer roof rail or gutter 27 for water draining from said roof panel 26, and provided at the lower inner side thereof with a downwardly opening groove or channel 28 and a downwardly extending flange 29 of substantially L cross section that collectively hold the base 30 of the weatherstrip 20.

In the present instance, the outwardly extending flange 24 is provided at the inner lower edge of the roof panel 26 with an upwardly extending downwardly opening groove 31, and the upstanding portion 32 of the gutter 27 has a closely return-bent edge portion 33, whereby a suitable trim or molding strip 34 of inverted substantially L cross section may embrace the outer side 32 and bottom of the gutter and have its transversely curved marginal edge portions 35 and 36 securely engaged with said groove 31 and return-bent edge portion 33 to improve the exterior appearance of the structure.

Preferably the lower part 37 of the downwardly extending flange 29 forms an attaching portion for a suitable head lining 38, a trim molding 39 of resilient material such as rubber or rubber composition, and a retainer strip 40 of sheet metal, and is provided below the weatherstrip 20 with an upwardly opening channel or trough portion 41 for receiving any water draining downwardly from the joint between the sealing flap portion 29' of said weatherstrip 20 and flange 19 when the door is in closed position.

The trim molding 39 has a base portion 42 disposed in surface-to-surface relation with the head lining 38 and is provided below the lower edge of said head lining with a trough portion 43 that is adapted to receive water overflowing the outer edge of the trough portion 41 of the flange 29 and that is engageable with the inner side 17 of the door header to form a second seal between the door and body headers when the door is in closed position. Thus, with my structure, water from outside the vehicle body is effectively prevented from entering the interior thereof.

The retainer strip 40 has a transversely curved body portion provided at opposite side edges with inturned flanges 44 and 45 and is received within a suitable groove 46 in the base 42 of the trim molding 39, whereby such retainer strip 40 cooperates with fastening means 47 to hold the trim molding 39 and head lining 38 upon the body header, and cooperates with the trim molding 39 to enhance and improve the interior appearance of the structure.

The fastening means 47 for the head lining 38, trim molding 39, and retainer strip 40 have head portions 48 within and concealed by the body portion of the retainer strip 40 and have shank portions 49 that extend outwardly through the space between said inturned flanges 44 and 45, through the base 42 of the trim molding, through the head lining 38, and project through and outwardly beyond suitable holes in the lower part 37 of the flange 29. In fact the projecting free ends of the shanks 49 are just below and upon the outer side of the base 30 of the weatherstrip and effectively hold such weatherstrip against accidental displacement from the groove 28 and flange 29.

What I claim as my invention is:

1. In combination, a vehicle body header, a weatherstrip having a base portion extending between cooperating retainer portions of said header and having a substantially vertical depending sealing flap portion, a door header having a downwardly opening channel for receiving the upper edge of a vertically slidable glass panel, the base of said channel having a laterally projecting flange engageable with the sealing flap portion of said weatherstrip when said door header is in closed position relative to said body header to provide a seal for water between the two headers, one of the cooperating portions aforesaid of said body header being provided below and in vertically spaced relation to the lower edge of said sealing flap portion with an upwardly opening trough portion for receiving any water seeping downwardly from the seal between said sealing flap portion and said lateral flange, and a trim molding carried by said one of the cooperating portions and having an upwardly opening trough spaced vertically below and adapted to catch any water overflowing the outer edge of the trough aforesaid, the last mentioned trough being wider than and substantially enveloping the trough aforesaid, whereby the outer side of the last mentioned trough is engageable by the inner side of the channel aforesaid when the door header is in closed position to form a second seal for water between the two headers.

2. In combination, a vehicle body header, a weatherstrip having a base portion extending between cooperating retainer portions of said header and having a sealing flap portion, a door header having a downwardly opening channel for receiving the upper edge of a vertically slidable glass panel and having a laterally projecting flange engageable with the sealing flap portion of said weatherstrip when said door header is in closed position relative to said body header to provide a seal for water between the two headers, one of the cooperating portions aforesaid of said body header being provided below and in vertically spaced relation to said sealing flap portion with an upwardly opening trough portion for receiving any water seeping downwardly from the seal between said sealing flap portion and said lateral flange, and a trim molding carried by said one of the cooperating portions and having an upwardly opening trough spaced vertically below and adapted to catch any water overflowing the outer edge of the trough aforesaid, the last mentioned trough being wider than and substantially enveloping the trough aforesaid, whereby the outer side of the last mentioned trough is engageable by the inner side of the channel aforesaid when the door header is in closed position to form a second seal for water between the two headers.

3. In combination, a vehicle body header, a weatherstrip having a base portion extending between cooperating retainer portions of said header and having a substantially vertical depending sealing flap portion, a door header having a laterally projecting flange engageable with the sealing flap portion of said weatherstrip when said door header is in closed position relative to said body header to provide a seal for water between the two headers, one of the cooperating portions aforesaid of said body header being provided below and in vertically spaced relation to the lower edge of said sealing flap portion with an upwardly opening trough portion for receiving any water seeping downwardly from the seal between said sealing flap portion and said lateral flange, and a trim molding carried by said one of the cooperating portions and having an upwardly opening trough spaced vertically below and adapted to catch any water overflowing the outer edge of the trough aforesaid.

4. In combination, a vehicle body header, a weatherstrip having a base portion extending between cooperating retainer portions of said header and having a substantially vertical depending sealing flap portion, a door header having a laterally projecting flange engageable with the sealing flap portion of said weatherstrip when said door header is in closed position relative to said body header to provide a seal for water between the two headers, one of the cooperating portions aforesaid of said body header being provided below and in vertically spaced relation to the lower edge of said sealing flap portion with an upwardly opening trough portion for receiving any water seeping downwardly from the seal between said sealing flap portion and said lateral flange, a trim molding upon the inner side of said one of the cooperating portions and having an upwardly opening trough spaced vertically below and adapted to catch any water overflowing the outer edge of the trough aforesaid, and means for fastening the trim molding to said one of the cooperating portions, including an element extending beside and operable to hold the base portion of said weatherstrip against displacement from both of said cooperating portions.

5. In combination, a vehicle body header, a weatherstrip having a base portion extending between cooperating retainer portions of said header and having a depending sealing flap portion, a door header having a portion engageable with the sealing flap portion of said weatherstrip when said door header is in closed position relative to said body header to provide a seal for water between the two headers, one of the cooperating portions aforesaid of said body header being provided below and in vertically spaced relation to the lower edge of said sealing flap portion with an upwardly opening trough portion for receiving any water seeping downwardly from the seal between said sealing flap portion and said lateral flange, a trim molding upon the inner side of said one of the cooperating portions, and means for fastening the trim molding to said one of the cooperating portions including an element extending beside and operable to hold the base portion of said weatherstrip against displacement from both of said cooperating portions.

6. In combination, a vehicle body header, a weatherstrip having a base portion carried by said header and having a sealing flap portion, a door header engageable with the sealing flap portion of said weatherstrip to form a watertight seal, a portion of said vehicle body header having below and in vertically spaced relation to said sealing flap portion a trough for catching water seeping from the seal aforesaid, and a trim molding also carried by said vehicle body header and having below and in vertically spaced relation to the trough aforesaid a trough for catching water overflowing the trough aforesaid.

References Cited in the file of this patent

UNITED STATES PATENTS

| | | | |
|---|---|---|---|
| 2,165,594 | Waterhouse | July 11, | 1939 |
| 2,319,723 | Crowe et al. | May 18, | 1943 |
| 2,356,976 | Conlon | Aug. 29, | 1944 |
| 2,383,575 | Wernig | Aug. 28, | 1945 |
| 2,484,176 | Lindemann | Oct. 11, | 1949 |
| 2,498,852 | Doty | Feb. 28, | 1950 |
| 2,536,863 | Widman | Jan. 2, | 1951 |
| 2,576,354 | Oswald | Nov. 27, | 1951 |
| 2,588,628 | Higbie | Mar. 11, | 1952 |

FOREIGN PATENTS

| | | | |
|---|---|---|---|
| 833,934 | France | Aug. 1, | 1938 |
| 675,687 | Great Britain | July 16, | 1952 |